March 18, 1930.  G. P. BEAUDRY  1,751,385
INTERNAL COMBUSTION ENGINE
Filed Sept. 8, 1927
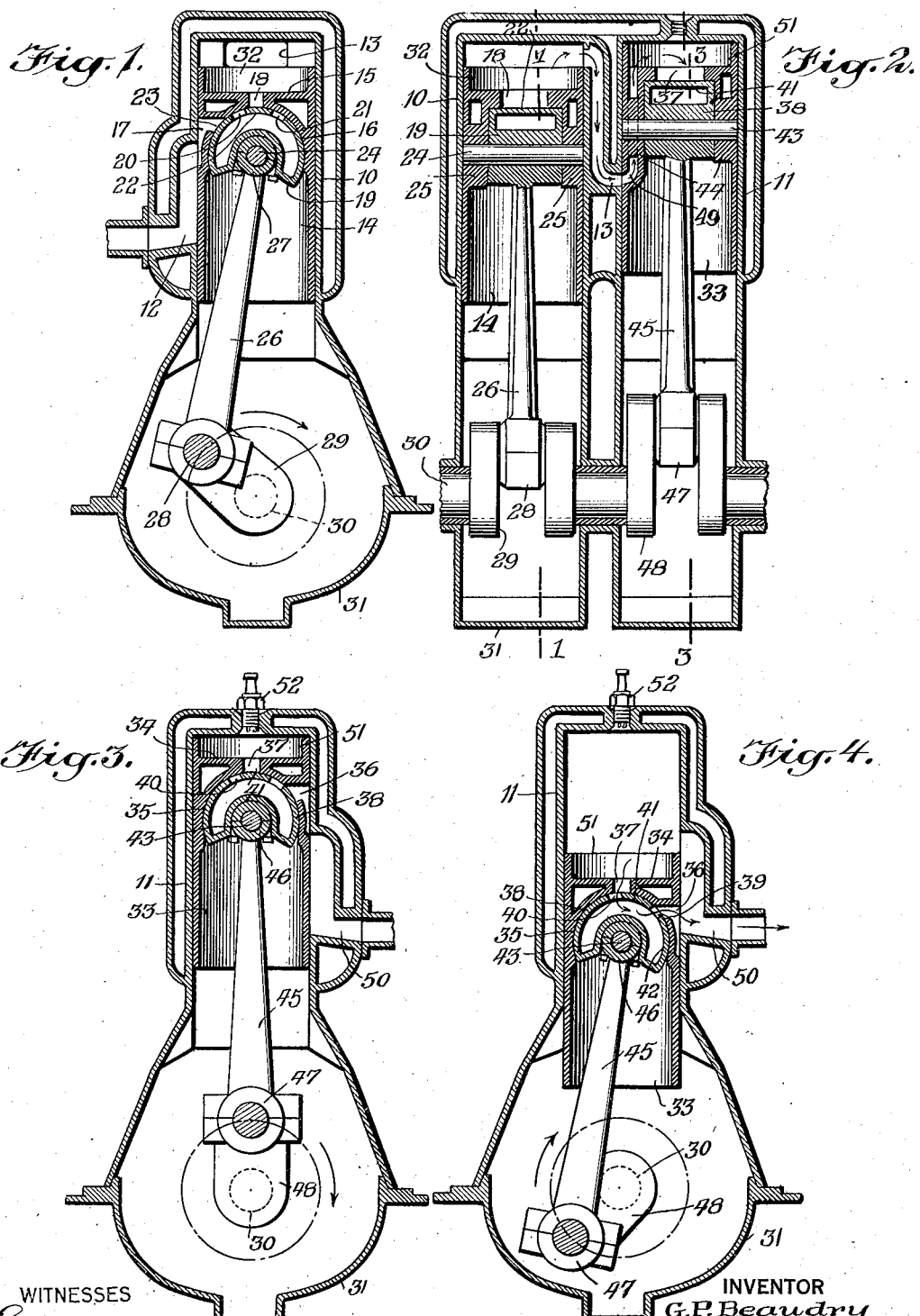
INVENTOR
G. P. Beaudry Patented Mar. 18, 1930

1,751,385

UNITED STATES PATENT OFFICE

GEORGE PAUL BEAUDRY, OF MONTREAL, QUEBEC, CANADA

INTERNAL-COMBUSTION ENGINE

Application filed September 8, 1927. Serial No. 218,265.

This invention relates to internal combustion engines, and has especial reference to internal combustion engines of the twin cylinder four cycle type.

The present invention contemplates an engine of the indicated type characterized by a simplified and cheapened construction, also characterized by a novel mode of operation which better adapts it to the use of liquid fuel such as gasoline, to the end that more thorough efficiency and more power will be obtained. In accordance with this object the usual poppet and sleeve valves will be eliminated, means being used for the admission of the fuel and the exhaust of spent charges of novel construction and operation. The engine is designed to perform perfectly and entirely the four cycles of the usual four cycle engine, and employs a new principle of compression and explosion which has distinct advantages over the usual type of four cycle engine. The advantages obtained are high compression and long expansion stroke, both of which contribute to increase the efficiency of the engine to a marked degree, aside from the fact that the engine will be comparatively light in weight.

Another object of the invention is to provide an engine of the indicated type in which one cylinder is employed for intake and compression of fuel only, while the other cylinder is employed for combustion or expansion of the compressed fuel and exhaust of the spent charges. In accordance with this object of the invention, the power cylinder has one explosion for every revolution of the crank shaft, the compression cylinder having none. The number of explosions for the two cylinders is equivalent to one explosion for every two revolutions, therefore as regards the number of power strokes, the result will be the same as in the usual four cycle engine. Furthermore the use of the two cylinder system mentioned is advantageous because the fuel is admitted into a comparatively cool cylinder, in which compression takes place under conditions more favorable than is usually the case in other types of engines, and because any expansion of the fuel due to the heating of the charge when it enters the heated power cylinder will exert a pressure on the piston in the power cylinder which will increase the power, because the engine can be designed to obtain a given compression pressure, which will be totally independent of the power or expansion stroke, and because the power or expansion stroke can be made much longer than in the usual type of engine, thereby giving greater efficiency and permitting the exhaust gases to be delivered cooler and at a lower pressure.

With the foregoing and other objects in view, the invention resides in the particular combination, relative disposition, and functions of the parts hereinafter fully described and illustrated in the accompanying drawing, in which—

Figure 1 is a vertical sectional view through the compression cylinder of the engine with the piston nearly at the end of its upward stroke, the section being taken on the line 1—1 of Fig. 2.

Fig. 2 is a vertical sectional view through both cylinders of the engine.

Fig. 3 is a vertical transverse sectional view taken on the line 3—3 of Fig. 2, through the power cylinder with its piston at the top of its stroke.

Fig. 4 is a view similar to Fig. 3, but showing the piston about to ascend, and illustrating the manner in which the spent charge is exhausted.

Referring now more particularly to the several views of the drawing, it will be apparent that, in the illustrated embodiment, the engine includes two substantially similar water jacketed cylinders 10 and 11. In accordance with the invention, the fuel such as a gasoline mixture is sucked into and compressed in the cylinder 10, and it is therefore to be understood that the cylinder 10 will be the compression cylinder of the engine. The cylinder 10 is provided with a fuel intake 12 which communicates directly with the interior of the cylinder. The supply of fuel sucked into the cylinder 10 and which is compressed is transferred to the cylinder 11 to be exploded therein, and it is therefore to be understood that the cylinder 11 will be the power cylinder of the engine. The compressed fuel is allowed to pass from the interior of the cylinder 10 to the interior of the cylinder 11 by a passage 13 which establishes communication between the interiors of said cylinders. The passage 13 leads from a point in the side wall of the cylinder 10 adjacent the head thereof, downwardly to a point in the side wall of the cylinder 11 half way down from the head of the cylinder 11.

Arranged for reciprocation in the cylinder 10 is a piston 14. The head 15 of the piston 14 has a substantially semi-circular recess 16, an inlet port 17 in the side thereof, and an inlet port 18 arranged coincidental with the longitudinal axis of the piston. A substantially semi-circular element 19 of hollow construction is adapted to be received in the recess 16. The element 19 has spaced openings or ports 20 and 21 respectively at opposite sides of a portion 22 which is adapted to control the inlet port 18, and said element 19 also having a portion 23 adapted to control the inlet port 17. A pin 24 extends transversely of the head 15 of the piston, the opposite ends thereof being journaled in suitable bearings 25. A crank rod 26 has a wrist 27 at its upper end which is connected with the pin 24 for pivotal movement, and the lower end of the rod 26 pivotally connected as at 28 with a crank 29 of a crank shaft 30 journaled in suitable bearings carried by the crank casing 31.

In order that the element 19 may be moved in response to the movement of the crank rod 26, the said element 19 is fixedly connected with the wrist 27 in any suitable manner. In the movement of the element 19, the ports 20 and 21 of the element 19 respectively move into and out of registration with the ports 17 and 18 of the piston head, and the portions 22 and 23 of the element 29 respectively alternately open and close the inlet ports 18 and 17. The arrangement is such that fuel will be supplied to the interior of the cylinder 10 above the piston to be compressed therein. The upper end of the piston 14 is provided with a flange 32 which closes the upper end of the passage 13 when the piston is at the limit of its upward movement to prevent any possible back pressure entering the cylinder 10.

Arranged for reciprocation in the cylinder 11 is a piston 33. The piston 33 has a head 34 having a substantially semi-circular recess 35. The piston 33 has an exhaust port 36 in the side wall thereof, and the piston head 34 has an exhaust port 37 coincidental with the longitudinal axis of the piston. A substantially semi-circular element 38 is arranged for rotatory movement in the recess 35. The element 38 is of hollow construction and has openings or ports 39 and 40 respectively at opposite sides of a portion 41 adapted to control the port 37, and said element also having a portion 42 adapted to control the port 36. A pin 43 is arranged transversely of the piston head 34 and its opposite ends are respectively journaled in bearings 44 embodied by the head 34. A crank rod 45 has a wrist 46 which connects the rod 45 with the pin 43 for pivotal movement, and the lower end of the rod 45 is pivotally connected as at 47 with a crank 48 on the crank shaft 30. In the rotatory movement of the element 38 the ports 39 and 40 of the element 38 respectively are brought into and out of registration with the ports 36 and 37, and the portions 41 and 42 of the element 38 respectively alternately open and close the ports 37 and 36.

The charge of fuel compressed in the cylinder 10 passes therefrom into the passage 13 and from the passage 13 into a passage 49 in the head 34 of the piston 33. The passage 49 is located at one side and the lower end thereof is adapted to communicate with the lower end of the passage 13, and the upper end of the passage 49 opens through the upper face of the head 34 so that the compressed fuel charge may enter the interior of the cylinder above head 34, as shown more clearly in Fig. 2. The cylinder 11 has an exhaust passage or outlet 50 which communicates with the interior of the cylinder 11. It is also to be observed that the exhaust port 36 in the piston head 34 is adapted to communicate with the outlet 50. The upper end of the piston 33 is provided with a flange 51 which closes the lower end of the passage 13 when the piston 33 reaches the limit of its downward movement. The crank 29 is at such angular position with respect to the crank 48 that in the rotation of the crank shaft 30, the piston 33 will have reached the limit of its up-stroke, just prior to the time the piston 14 reaches the limit of its up-stroke. It will also be apparent that the piston 33 will have begun its down-stroke to a small degree, just as the piston 14 reaches the limit of its up-stroke. It will therefore be understood that there will not be any appreciable expansion of the fuel charge before explosion takes place in the combustion cylinder 11.

The operation of the engine is as follows. A supply of fuel is admitted into the compression cylinder 10 in the space above the head 15 of the piston 14 during the full length of the downward stroke of the piston 14. The fuel passes through the intake 12, through the port 17 which is in communication with the intake 12, through port 20 while in registration with port 17, through port 21 while in registration with port 18. Compression takes place during the upward stroke of the piston 14 until the piston has reached a point almost to the limit of its upward stroke. At that point the compressed charge of fuel in the compression cylinder is admitted to the power cylinder 11 through the passages 13 and 49. This admission of the compressed charge will last during the time that is required for the compression piston 14 to reach the end of its upward stroke, that is to say compression continues during the time of admission to the power cylinder 11. As soon as the power piston 33 starts on its downward stroke the lower end of the passage 13 is closed. Immediately after this closing, explosion takes place and the charge expands throughout the downward stroke of the power piston 34. The exhaust of the spent charge takes place at the end of the downward stroke of the power piston 33 and continues all through the upward stroke of the piston 33. When the piston 33 is at the end of the downward stroke, the crank rod 45 will have imparted rotary movement to the element 38 to bring the ports 39 and 40 respectively in registration with the ports 36 and 37, allowing the spent charge to pass from the interior of the cylinder 11 through the element 38 out through the exhaust outlet 50. It is to be observed that when the power piston 33 is at the end of its upward stroke, the element 38 will have been moved to a position in which the portion 41 thereof closes the port 37 in the piston head 34.

It is to be understood that the head of the power cylinder 11 will be provided with a suitable spark plug 52 forming part of an ignition system operating in timed accord with the other parts of the engine for igniting the explosive charges and the cylinder 11.

I claim:

1. In an internal combustion engine, a first cylinder to which fuel is admitted and in which the fuel is compressed, a second cylinder in which the fuel compressed in the first cylinder is exploded and from which the spent gas is exhausted, the compressed fuel entering the second cylinder from the first cylinder by a passage establishing communication between the interiors of both cylinders, and a power piston operable in the second cylinder, said piston being provided with a delivery passage for the purpose of admitting the compressed fuel to the second cylinder through the first mentioned passage, said piston being provided with valve means operated by the movement of the piston for the purpose of controlling the discharge of exhaust gas from the second cylinder.

2. In an internal combustion engine, a combustion cylinder provided with a compressed fuel inlet, a piston arranged for operation in said cylinder, said piston being provided with a passage which communicates with said inlet in the up-stroke of the piston, for the purpose of delivering a charge of compressed fuel to said cylinder above the piston, and said piston being provided with valve means operated by the movement of the piston for the purpose of discharging the exhaust gas from the cylinder.

3. In an internal combustion engine, a compression cylinder provided with a fuel inlet, a combustion cylinder provided with an exhaust outlet, a passage establishing communication between the interiors of said cylinders, a compression piston operable in said compression cylinder, a power piston operable in said combustion cylinder, said compression piston being provided with valve means operated by the movement of said piston for controlling the delivery of fuel from said inlet to the compression cylinder above the piston therein, said power piston being provided with a fuel delivery passage, for the purpose of admitting compressed fuel from the compression cylinder into the combustion cylinder through the first mentioned passage, and said power piston being provided with valve means operated by the movement of said piston, for the purpose of controlling the discharge of exhaust gas from the combustion cylinder through its outlet.

Signed this 1st day of September, 1927.

GEORGE PAUL BEAUDRY.